Figure 4:
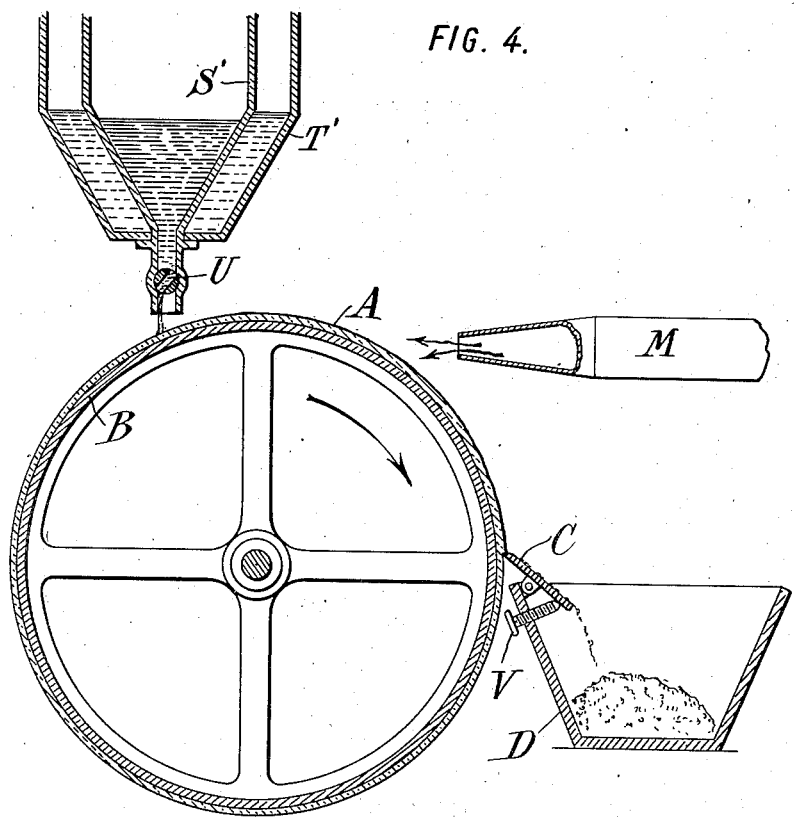

C. H. CAMPBELL.
MAKING DRY MILK.
APPLICATION FILED APR. 28, 1908.
1,002,496.
Patented Sept. 5, 1911.
4 SHEETS—SHEET 1.
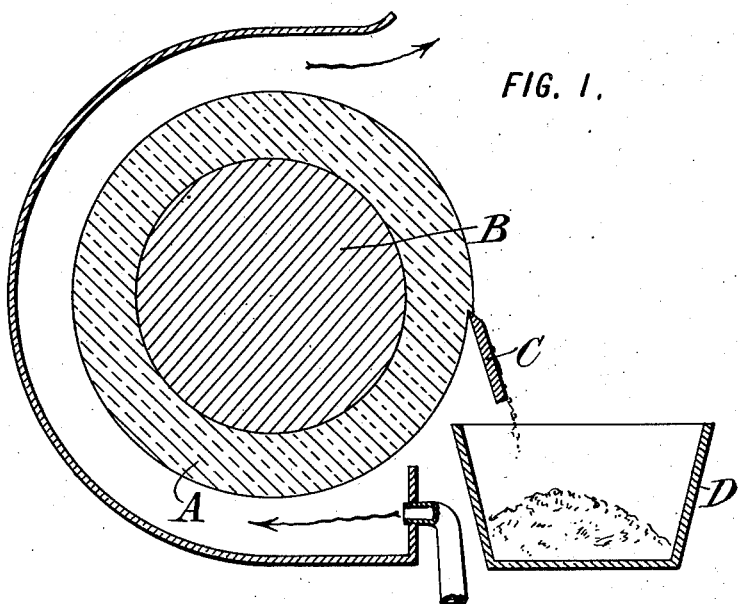
FIG. 1.
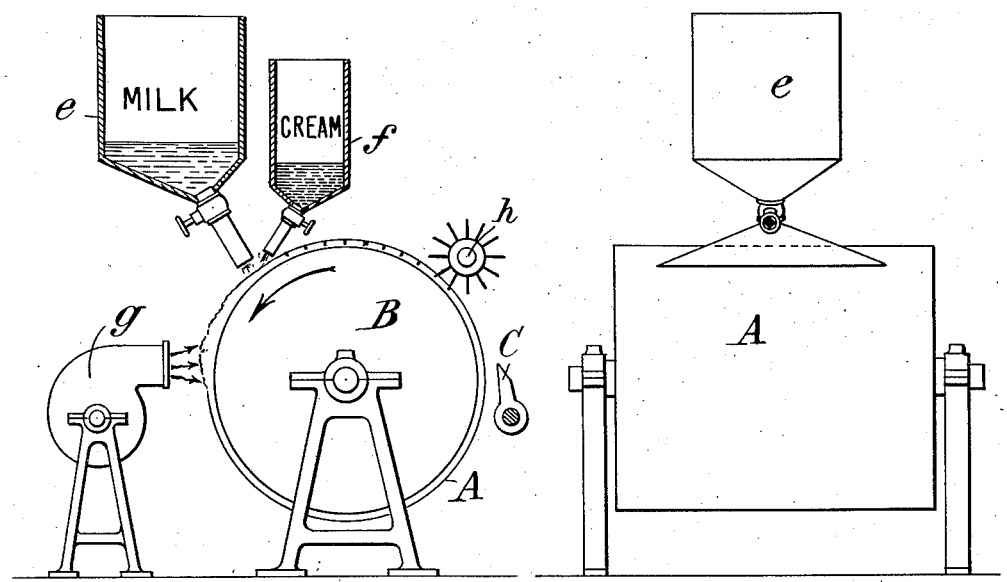
FIG. 7.
FIG. 8.
WITNESSES:
INVENTOR:
Charles H. Campbell,
By Attorneys, C. H. CAMPBELL.
MAKING DRY MILK.
APPLICATION FILED APR. 28, 1908.
1,002,496.
Patented Sept. 5, 1911.
4 SHEETS—SHEET 2.
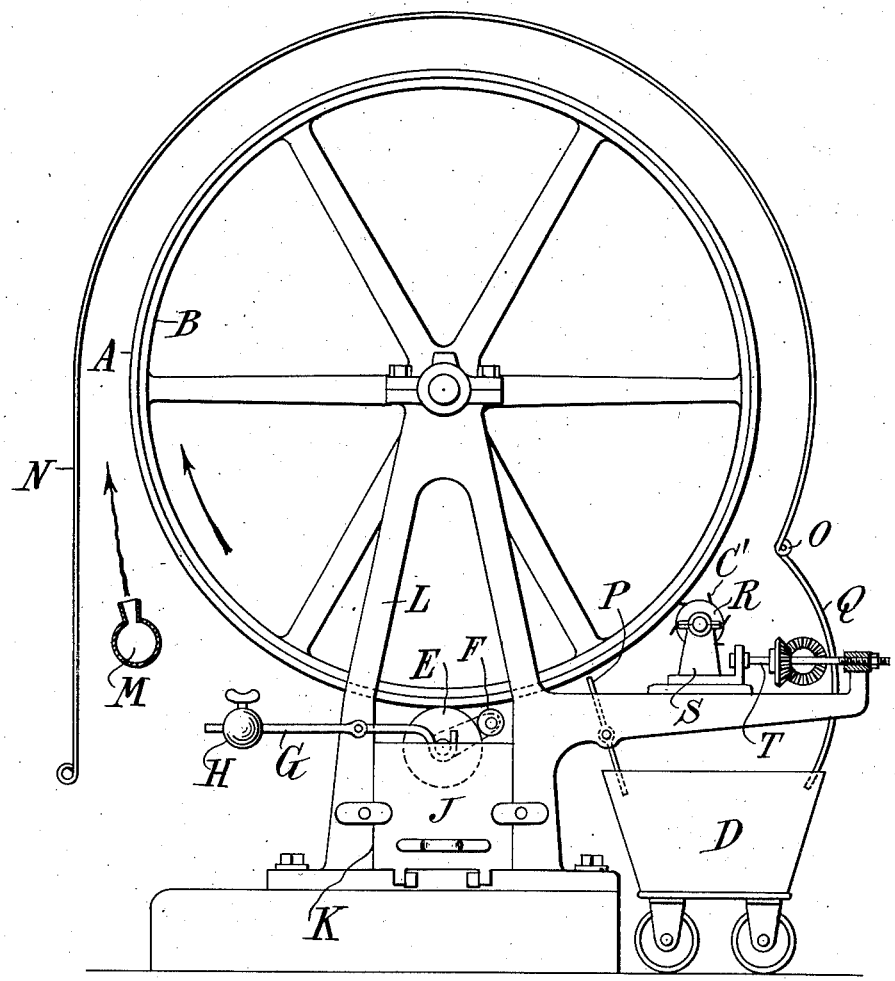
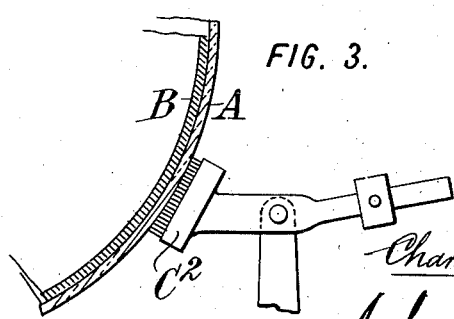
WITNESSES:
INVENTOR: Charles H. Campbell,
By Attorneys.

C. H. CAMPBELL.
MAKING DRY MILK.
APPLICATION FILED APR. 28, 1908.

1,002,496.

Patented Sept. 5, 1911.
4 SHEETS—SHEET 3.

WITNESSES:

INVENTOR:
Charles H. Campbell,
By Attorneys,

C. H. CAMPBELL.
MAKING DRY MILK.
APPLICATION FILED APR. 28, 1908.

1,002,496.

Patented Sept. 5, 1911.

4 SHEETS—SHEET 4.

WITNESSES:

INVENTOR:
Charles H. Campbell,
By Attorneys

UNITED STATES PATENT OFFICE.

CHARLES H. CAMPBELL, OF NEW YORK, N. Y.

MAKING DRY MILK.

1,002,496.  Specification of Letters Patent.  Patented Sept. 5, 1911.

Application filed April 28, 1908. Serial No. 429,671.

*To all whom it may concern:*

Be it known that I, CHARLES H. CAMPBELL, a citizen of the United States, residing in the borough of Manhattan, city, county, and State of New York, have invented certain new and useful Improvements in Making Dry Milk, of which the following is a specification.

This invention aims to provide an improved process for making dry milk in such a form and consistency as to avoid the compression of the particles which in previous forms of flanked or ground dry milk has resulted in a hardness of the particles constituting the product, so great as to seriously retard the rate of solution in water.

According to the present invention there is no substantial compacting of the solids, and the milk is converted first into particles which have little or no cohesion when they are thoroughly dry, so that they crumble to a fine light dust, which is the commercial form of the product. The cohesion of the particles may be increased or diminished by increasing or diminishing the quantity of cream mixed with the milk and the corresponding quantity of fat in the product. The product, although of a higher specific gravity than water, is not compacted into flakes or dense grains, but is a fine powder in such a loose condition that it floats on water until it is stirred in, instead of immediately sinking to the bottom of the vessel as is the case with the harder dry milk previously manufactured. The product is also obtainable by a process having substantial advantages in simplicity, quickness and cheapness as compared with previous processes.

An important step of the process is in the removing of the milk in thin particles from a thicker body of solidified milk, the body from which the particles are removed being preferably in a still coherent condition. Such a thick, coherent body is preferably obtained by forming and drying a succession of films upon one another, as upon the outside of a rotating drum or the like, until a suitably thick body of solidified milk is secured, time being allowed for sufficient drying of the separate films and for sufficient drying and hardening of the thick body. The hardness of this body may vary within certain limits, depending upon the product and the form of the particles to be removed therefrom. Preferably it will be of such consistency that the particles can be cut sharply from it and so that the particles will contain very little or no removable moisture, and, upon exposure to the air, even in a mass of such particles, will quickly become dry enough for packing and transportation. The block or body of solidified milk, however, may contain so much moisture as to require the carrying of the particles into an oven or other drier, as by catching them on a continuous belt and conveying them through the oven. Various other methods of forming the block or mass of solid milk may be utilized, however; a variety of such methods, including vacuum processes, spraying processes, film processes, and combinations of these, being known.

The accompanying drawings illustrate the process as carried out by several different styles of apparatus.

Figure 5:
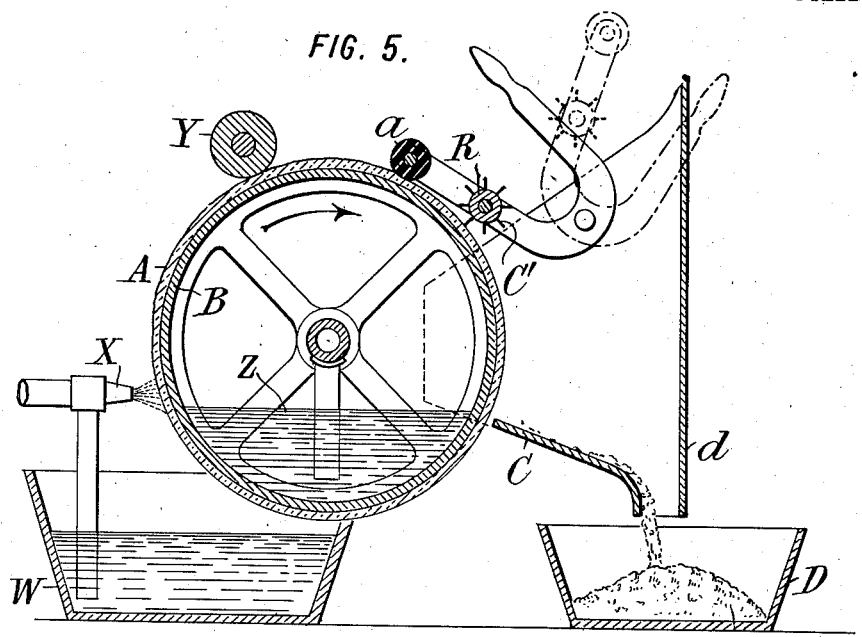
Figure 6:
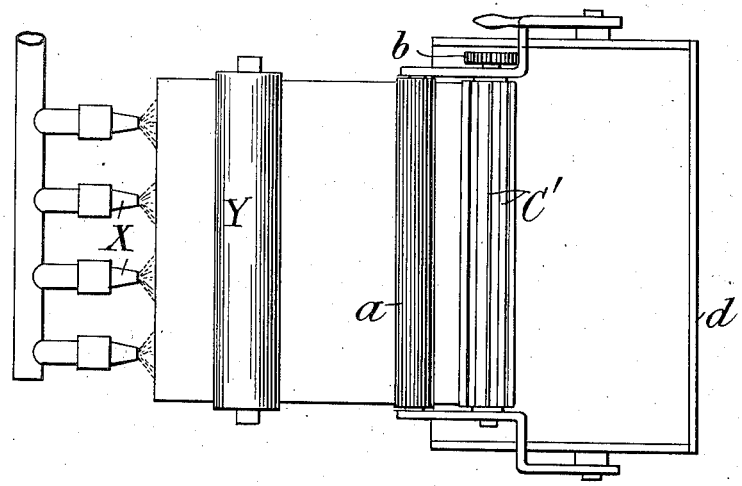

Figure 1 is a diagram illustrating the principle. Fig. 2 is a partial end view and partial cross-section of an apparatus for carrying out the process. Fig. 3 is a modified detail of the apparatus of Fig. 2. Fig. 4 illustrates in vertical section another style of apparatus. Figs. 5 and 6 illustrate in vertical section and plan respectively still another style of apparatus. Figs. 7 and 8 illustrate in end and side elevation respectively another type of apparatus.

Referring first to Fig. 1, A represents a loaf or block or mass of stiff milk, such as may be obtained, for example in the drum shown in Patent No. 668,162, of February 19, 1901, granted to Joseph H. Campbell and myself; or which may be obtained by various other processes so regulated as to produce not a completely desiccated product, but one which contains sufficient moisture to give it coherence. For convenience in handling, the mass A is supposed to be formed upon a central shaft B, so that by rotating the shaft the mass can be rotated, while a knife C is held in position to take off fine particles which fall in a loose mass into a vessel D or on to any convenient means for carrying them into a drying room in case further drying is desired. This figure illustrates the possibility of carrying out the last part of the process efficiently by hand. Preferably, however, mechanism is used which makes it possible to handle larger quantities of material at a good speed. In Fig. 2, for example, the milk, preferably in a concentrated condition, is laid upon a large drum D, being spread thereon thinly by rolls E and F similar to the inking rolls of printing presses; the roll E being supported in arms G and pressed upward by a counterweight H and having its lower part running in a trough-shaped vessel J which is adapted to be rolled edgewise into and out of place in the compartment K provided for it between the uprights L which support the drum. The drum is rotated say in the direction of the arrow a number of times until it acquires a substantial coating A of milk, and is allowed to stand if necessary in order to harden this a little. The extraction of moisture is facilitated by jets of hot air from a pipe M, the hot air being caused to pass substantially around the drum by reason of a hood N which surrounds the same at a suitable distance and which is pivoted at O to permit it to be raised on occasion. A deflector P is used to prevent the current of hot air from blowing all the way around the drum D and on to the spreading rolls E and F. It also forms a guard, together with the fixed guard Q, for directing the particles into the vessel D. The removal of the small particles of milk is effected in this case by a rotating cylinder R carrying a number of knives C', the cylinder being mounted on blocks S which are adjusted toward and away from the drum D by means of screw shafts T rotated by any suitable gearing as shown.

Instead of the knife-carrying drum R which removes the milk in the form of thin strips a series of wires may be used, as in Fig. 3, constituting in effect a brush $C^2$ which scrapes the material from the mass A in the form of thin threads or needles. The brush may be counterweighted as shown, or may be rigidly adjusted to obtain the desired depth of cut in accordance with the hardness of the mass and the size of the particles to be removed.

The apparatus of Fig. 4 shows the milk reduced in a vessel S' with a water-jacket T' to the desired degree of concentration, say for example to one-fourth or less of its original volume. This preliminary concentration of the milk is highly advantageous in effecting a saving of time and a consequent improvement in the quality of the product, because the milk deteriorates very rapidly while in liquid form; but it is not an absolutely essential limitation of the broad invention, as the entire concentration may be effected on the drum. But in handling the mass in its first very liquid state the concentration can be effected more rapidly at a low temperature by heating in such a vessel as is shown at S', and blowing air through, and it is preferred to accomplish the first part of the concentration in this way. From the vessel S' the milk is run at a measured rate through the valve U on to the drum B, and the drum is rotated while a blast of hot air from the pipe M dries the mass A in a succession of superimposed films until the desired thickness is obtained. Then, after a sufficient delay (if necessary) to permit the mass to harden, the knife C is adjusted by one or more set-screws U to cut the particles of milk off into the vessel D.

With the apparatus of Figs. 5 and 6 we suppose the milk, with or without preliminary concentration, carried in a vessel W from which it is taken up by compressed air atomizers X and sprayed on to the surface of the drum B, which rotates in the direction of the arrow. The mass is then spread uniformly by a roller Y, and the drum is rotated a sufficient length of time to dry and solidify the mass on it. The drying may be hastened by maintaining a supply of hot water Z within the drum, or by blowing air on the outside of the drum, as described in connection with the previous apparatus, or by any combination of these agencies of heat and air currents; or if the mass is sufficiently concentrated before being introduced into the vessel W or by the subsequent spraying, or by both these agencies, it will harden on the drum B by its mere exposure to the atmosphere. During the formation and hardening of the mass A the rotating cylinder R carrying the knives C' is thrown back to the position shown in dotted lines. When the mass is sufficiently hardened and ready for removal, the frame carrying the cylinder R is swung over to the position shown in full lines, so that the roller a in its end bears on the mass and maintains the drum R in a position to cut to a uniform depth below the surface of the mass of milk. The drum R may be rotated at a rapid rate, as by means of a pinion b at one end, as shown in Fig. 6, or in any other suitable way, and the particles fall between the guide plates c and d into the vessel D.

In the apparatus of Figs. 7 and 8, provision is made for measuring accurately the quantity of cream introduced, and consequently the quantity of fat in the product. The vessel e carries skim-milk and the vessel f cream. By means of suitable valves in the bottoms of these vessels the skim-milk and cream run at measured rates upon the drum B, where they are subjected to a blast of air from a blower g and are dried and hardened as previously described, and afterward removed in small particles by a cutting tool of any sort.

Besides the control of the size of the particles by the adjustment of the scrapers as described, a bolt or screen may be used to remove any particles which are too large.

With any of the apparatus shown the drying may be expedited by the use of a drum $h$, as shown in Fig. 7, which has wires that penetrate the mass of milk and permit the escape of moisture from the interior thereof.

Ordinarily the scraper will remove all of the previously dried milk before another supply of milk will be presented to it; the forming of the coherent mass being naturally an intermittent operation. But it is within the invention to obtain this mass in any known or suitable way within the claim hereinafter. The thickness of the coherent mass will need to be but a fraction of an inch, but it may be increased beyond this amount to an extent depending chiefly upon the stiffness of the mass. There is no liability of spoiling where the scraping operation is to be performed promptly.

What I claim is:—

The process of manufacture of dry milk which consists in partially concentrating milk, spreading such partially concentrated milk in a succession of films upon one another and drying said films sufficiently to form a thick body of solidified milk, allowing said body to set or stiffen, and removing from said body separate small particles by cutting, which are adapted to readily dry and crumble to a light uncompacted mass.

In witness whereof, I have hereunto signed my name in the presence of two subscribing witnesses.

CHARLES H. CAMPBELL.

Witnesses:
DOMINGO A. USINA,
FRED WHITE.